United States Patent [19]

Hennecke et al.

[11] Patent Number: 4,962,310

[45] Date of Patent: Oct. 9, 1990

[54] RADIANT UNIT

[75] Inventors: Udo Hennecke, Alzenau; Ralf Schönfelder, Bruchköbel, both of Fed. Rep. of Germany

[73] Assignee: Heraeus Quarzschmelze GmbH, Hanau, Fed. Rep. of Germany

[21] Appl. No.: 325,733

[22] Filed: Mar. 20, 1989

[30] Foreign Application Priority Data

Jul. 12, 1988 [DE] Fed. Rep. of Germany ....... 3823512

[51] Int. Cl.$^{5}$ ............................................ H04B 10/00
[52] U.S. Cl. .............................. 250/494.1; 250/504 R
[58] Field of Search .................... 250/494, 503, 504 R

[56] References Cited

U.S. PATENT DOCUMENTS 2,338,559 1/1944 Winkelmeyer .
4,241,493 12/1980 Andrulitis et al. ...................... 437/2
4,798,960 1/1989 Keller et al. .................... 250/504 R

FOREIGN PATENT DOCUMENTS 8209191 8/1982 Fed. Rep. of Germany .

*Primary Examiner*—Bruce C. Anderson
*Attorney, Agent, or Firm*—Felfe & Lynch

[57] ABSTRACT

Radiant units are known in the form of a plate-like assembly having a supporting frame which accommodates a plurality of radiant lamps on holders, the radiant lamps being shielded by a front cover and a back cover, the front cover, which is permeable to radiation, being held removably. To design a radiant unit so as to permit easy and rapid installation as well as the quick replacement of the front cover as well as of the rear cover in order to change the internally mounted radiator, and also to permit compensation for different thermal expansion between the covers and the supporting frame, the front and/or rear cover are held with their outer faces against abutments joined to the supporting frame, and spring-loaded clamps are associated with the inner faces and urge the cover from the inside against the abutments.

6 Claims, 2 Drawing Sheets

RADIANT UNIT

BACKGROUND OF THE INVENTION

The present invention relates to a radiant unit in the form of a plate-like assembly with a supporting frame which accommodates a plurality of radiant lamps on mountings, the radiant lamps being protected by a front cover and a rear cover, while the front cover which is permeable to radiation is removably held.

Such radiant units are generally known, for example from Heraeus Quarzschmelze's product information on INFRAROT "Medium-wave Modular Infrared Radiator", Q-D1/140 D/E, D/E 3c 6.85/VN S&S. These radiant units can be used for drying and heating in the production of small parts in the laboratory and in the molding of thermoplastics. The size of these radiant units amounts to about 250×500 mm. Several of radiant units of this kind can be assembled to form a wall or other large-area radiant unit, such as a radiation tunnel or a portal for irradiating large pieces or objects. The housing of these radiant units consists of a sheet metal box open at one end with a supporting frame as reinforcement, from whose open end the radiator is inserted and fastened. Depending on the application, the front side of these radiant units is covered by a grille, for example. Radiant units are also known, however, in which the covering consists of a glass plate which is permeable to the radiation (usually infrared radiators are used in such radiant units). After a relatively long period of use it is found that dust and other dirt particles settle on the covers, which from time to time fall on the object being irradiated, or on the other hand reduce the transparency of a plate. The covers must therefore be cleaned repeatedly or replaced; for this purpose cleats with which they are fastened to the supporting frame have to be removed and then screwed back again. Furthermore, it has been found that covers of vitreous fused silica fastened with cleats break, since when the radiator is in use tensions develop between the glass plates and the frame or covers, due to the different coefficients of longitudinal expansion.

SUMMARY OF THE INVENTION

It is the purpose of the present invention to design a radiant unit of the kind described above such that simple and rapid assembly as well as quick replacement of the front cover and rear cover will be possible for the purpose of changing the internally mounted radiator, while still allowing compensation for differences in length between the covers and the supporting frame.

This purpose is accomplished in a radiant unit of this kind by the fact that the outer face of the front and/or rear cover engages abutments connected with the supporting frame and springbiased clamps are associated with the inside face which engage the inside face and urge the cover against the abutments. The covers are urged by the clamps against the abutments engaging the outer face such that they are on the one hand securely held, but on the other hand they are still able to shift due to longitudinal expansion. To remove the cover, the cover is pressed inwardly against the force of the clamp and lifted over the abutments. In this manner the front covers can easily be removed for cleaning. Covers on the back of the radiant unit, which are held by such clamps, may be necessary in order to replace the radiator or to provide good accessibility to the electrical connections of the radiator. The abutments against which the outside of the covers rests can be constituted by frames or parts of frames which are screwed or welded to the supporting frame. In this case cleats may be sufficient, which are associated with two opposite lateral edges of the cover, preferably the longer sides of the cover. Clamps in the area of two opposite lateral edges of the cover are sufficient to hold the covers uniformly. The clamps are preferably biased by spiral springs which are aligned with their axis in the direction of the surface normals of the covers and are guided on a pin or stud or other guide, depending on their length. So as to obtain not just point contact at the clamps, the clamps can engage bars or cleats which lie against the inside face of the covers and extend each along an end margin of the cover. Depending on the size of the covers, a bar with a clamp engaging its center, or a bar with a clamp at each end, will suffice.

In an additional preferred embodiment, in which the covers are rectangular or square plates, their size is selected such that it is held behind the abutments so as to be displaceable behind the abutments, in the direction of one lateral edge over a distance corresponding to the overlap of the end margin by the abutment associated with it. For removal in this arrangement, the covers are shifted in the one direction behind the abutments until the other end margin is released from the abutments associated with it. But to hold such a cover firmly in the installed state, a bar with a projection retaining the end of the cover may be advantageous, so that the covers are fixed in their position by the bars. To remove the covers the bar is pressed toward the interior against the spring-loaded clamps, until the projection clears the lateral edge. A radiant unit has proven to be advantageous which has a front cover which is a glass plate permeable to infrared radiation and is provided with infrared radiators.

DETAILED DESCRIPTION OF THE PREFERRED EMBODIMENT

Figure 1:
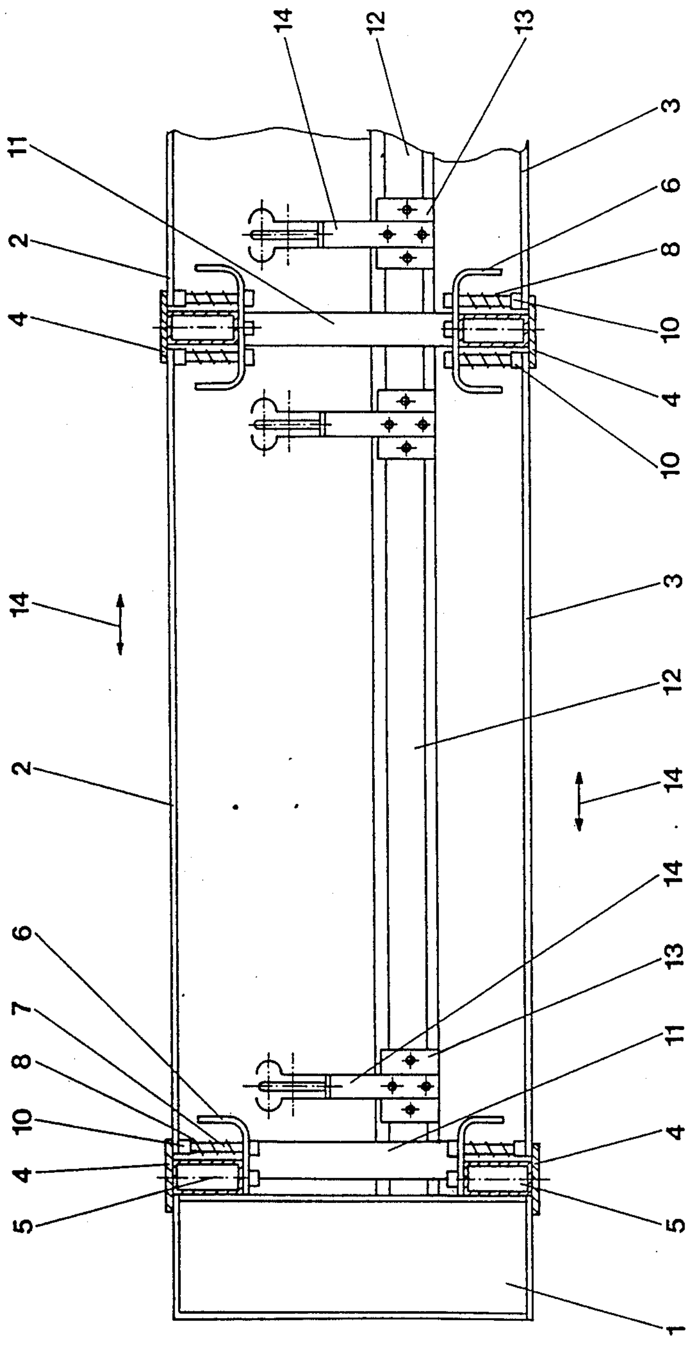
FIG. 1 shows a longitudinal section through a radiant unit with a front cover and a back cover.
Figure 2:
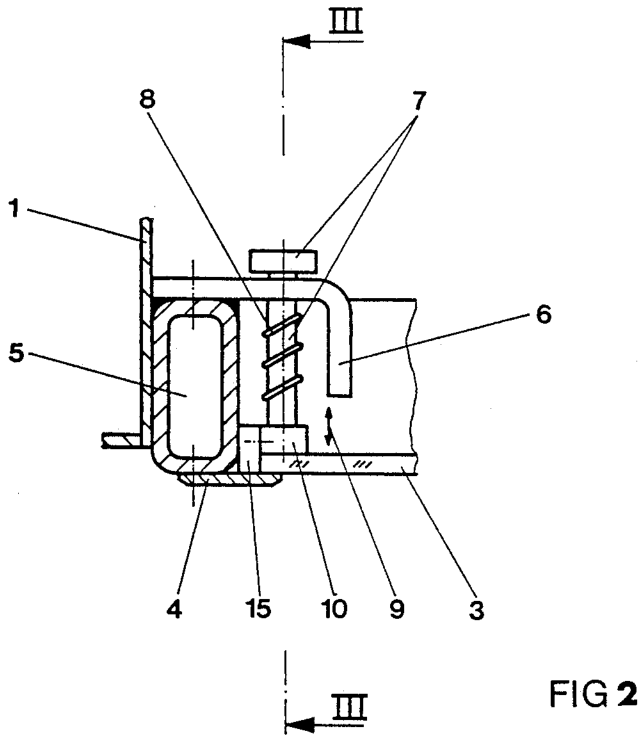
FIG. 2 is an enlarged representation of the system in FIG. 1 in the area of a spring-loaded clamp.
Figure 3:
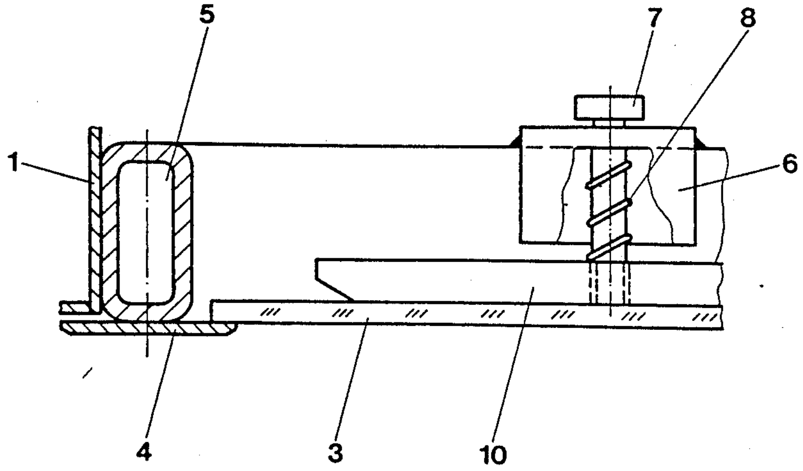
FIG. 3 is a section along line III—III in FIG. 2.

The radiant unit in accordance with FIG. 1, of which only the left half can be seen, has a supporting frame 1 in the form of a box with a front cover 2 and a back cover 3. The two covers 2 and 3 lie with their outer faces against abutments 4 which are constituted by rails screwed to two opposite sides of the rectangular or square supporting frame 1. Secondary frames 5 are fastened on both ends to the inside of the supporting frame 1 and bear, on a bracket 6, a pin 7 passing through a spring 8, as seen also in FIGS. 2 and 3. Pin 7 is displaceable in the direction of the arrow 9, i.e., perpendicular to the cover 2 or 3, while spring 8 urges a bar 10 against the backs of the covers. At least two springs 8 are associated with each bar 10 at the ends of the bars 10, as seen in FIG. 3.

To divide the radiant unit, whose size is limited by the supporting frame 1, into radiant units with covers 2 and 3 of smaller size, additional secondary frames 5 are disposed in the middle part of the radiant unit; these serve to accommodate the springs 8 for their adjacent covers 2 and 3 and the abutments 4 are fastened to them.

On the supporting frame 1 and on supports 11, rails 12 are fastened, which are horizontally disposed, i.e., they run parallel to the covers 2 and 3, and which accommodate mountings 13 with holders 14 for infrared radiators which are not shown. Both the front cover 2 and the back cover 3 can be displaced in the direction of the arrows 14, so that they can be brought out from behind the overlapping abutments 4 (in this case they are elongated, flat bars) to remove them from the radiant unit. In this manner the infrared radiators are easily accessible through the front cover 2, and the electrical connections for the radiators on the mountings 13 are easily accessible through the back cover 3. Since covers 2 and 3 are displaceable in the direction of the arrows 14, i.e., their length is shorter than the clearance between the secondary frame 5, a bar 10 can be used with a second piece 15 to block the end of cover 3, as shown in FIG. 2, and hold the cover in its position. By pressing bar 10 rearwardly in the direction of the arrow 9, the cover 3 can be released. The spring-loaded clamps permit the easy replacement of covers 2 and 3; the covers are at the same time held securely in place by the bars 10 biased by the springs 8. Furthermore, different coefficients of expansion between frames 1, 6, and covers 2, 3, of vitreous fused silica, can be compensated.

We claim:

1. Radiant unit in the form of a plate like assembly comprising a supporting frame comprising holding means for accommodating a plurality of radiant lamps, said frame having openings at each of two opposed sides and a pair of abutments associated with each opening, a cover located in each of said openings, each cover having opposed ends, one of said covers being permeable to radiation, each cover having an inward surface and an outward surface located against said abutments at opposed ends;

a pair of spring loaded clamps associated with each opening to hold the respective cover against the abutments, each clamp comprising a bracket fixed to said frame, a bolt passing through said bracket and extending perpendicularly toward an end of the inward surface of the cover, a cleat fixed to the end of the bolt against the cover, and a compressed spring between the bracket and the cleat, whereby, each said cover is spring loaded against the abutments of the frame, and may be released by bearing against the cover.

2. Radiant unit as in claim 1 wherein an auxiliary frame is mounted to each side of the supporting frame and brackets for accommodating the bolts are disposed at these auxiliary frames.

3. Radiator unit as in claim 2 wherein said auxiliary frames comprise said abutments.

4. Radiator unit as in claim 1 wherein the abutments are parts screwed to the frame.

5. Radiator unit as in claim 1 wherein the covers are rectangular plates which are held for displacement behind the abutments toward each end by a distance corresponding to the overlap of the other end by the abutment associated therewith.

6. Radiator unit as in claim 1 wherein each cleat has a projection which overlaps the end of the cover to prevent lengthwise displacement thereof when the cover is clamped against the abutments.

* * * * *